Patented Dec. 16, 1930

1,785,327

UNITED STATES PATENT OFFICE

IWAN OSTROMISLENSKY, OF NEW YORK, N. Y., ASSIGNOR TO OSTRO RESEARCH LABORATORIES, INC., OF NEW YORK, N. Y., A CORPORATION OF NEW JERSEY

ALKYL-PHENYL ETHER

No Drawing.  Application filed April 11, 1930. Serial No. 443,615.

This application is a continuation in part of the application filed by me on May 15, 1929, Serial No. 363,413.

This invention relates to a new series of azo dyes useful in the treatment of various germ infections and their method of manufacture. The compounds of the present invention have very low toxicity as indicated by the fact that mice tolerate them when injected subcutaneously in doses not less than .1 gram per kilo body weight and as high as .5 gram per kilo body weight, the latter dosage being that used when the preferred compound is employed, namely, para ethoxy phenyl azo diamino benzene. On account of the low toxicity the compounds may be used not only as a medicine but for the prevention of growth of germs in various food products, and on account of the dyeing properties of the compounds may be found useful in coloring food and other products in which the color is appropriate. The compounds are active in preventing the growth of germs, particularly of the cocci group. On peptone agar media, staphylococcus albus and aureus and streptococcus hæmolyticus show no growth when a dye of this series is present in dilutions varying from one in five thousand in the case of para propoxy phenyl azo diamino benzene, to one in twenty-five thousand in the case of the preferred compound, para ethoxy phenyl azo diamino benzene. Hence they are useful in preserving food and other products subject to bacterial decomposition.

They are also useful as antiseptics and the preferred compound in the form of the hydrochloride when taken orally in doses from .1 to .6 gram daily is absorbed by the organs and tissues of the genito-urinary tract and is eliminated from the system in the urine. It has been found useful in the treatment of cystitis, pyelitis, urethritis, salpingitis and in general in infections of the genito-urinary tract, The new dyes comprise para hydroxy phenyl azo metaphenylene diamine and corresponding alkyl ethers, having the general formula

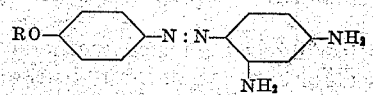

in which R is hydrogen or alkyl. The bactericidal action of these compounds is greatly reduced by having the nitro group, F, Cl, Br, or the carboxylic, sulphonic, sulphinic or other acid radical directly attached to either benzene nucleus. One amino group must be in the para and the other in the ortho position to the azo group.

In general, they are yellow or brownish yellow crystalline solids only very slightly soluble in water but easily soluble in alcohol. They usually exist in both the normal and quinoid modifications one being of darker color than the other. They easily form salts with acids. The hydrochloride is readily soluble in water. The higher members of the series, however, hydrolyze easily precipitating the base in water solution.

In general they can be prepared by diazotizing para hydroxy phenyl azo metaphenylene diamine or corresponding alkyl ethers, and coupling with a diamino benzene such as metaphenylene diamine.

Method of preparation of para hydroxy phenyl azo meta phenylene diamine.

Dissolve 10.9 gms. of para amino phenol in 200 gms. of distilled water and 20 cc. of hydrochloric acid (sp. g. 1.19), cool to 5° C. and diazotize slowly at 5° C. by adding drop by drop a solution of 7.3 gms. of sodium nitrite in 30 cc. water. The end of the reaction is indicated by the usual starch iodide paper test.

10.8 gms. of meta phenylene diamine and 42 gms. of sodium acetate (3 mol. water of crystallization) are dissolved in 300 cc. distilled water by boiling and filtering if necessary. After cooling to 5° C. it is added evenly to the diazotized solution stirring constantly.

After standing for one hour ammonia is added in slight excess i. e. to produce a faint alkaline reaction, filter and after washing the precipitate with 300 cc. water and drying dissolve it in a minimum quantity of hot methyl alcohol. Filter this solution while still hot, allow it to cool on ice, filter once more and dry the precipitate in a desiccator. The free base should consist of yellow fibrous crystals which when heated in a capillary change color at 215° C. and melt with decomposition at 220° C. It should be only slightly soluble in hot water and almost insoluble in cold water. For this reason it can be purified by recrystalizing from a large volume of water.

To form the hydrochloride one molecule of the base is mixed with slightly more than one molecule of hydrochloric acid and evaporated over a water bath to dryness. The latter is a black powder which dissolves readily in water to form a 1% solution of a cherry red color.

The following is a general method which can be used for synthesizing any of the alkyl ethers of para hydroxy phenyl azo metaphenylene diamine and their hydrochlorides.

Method of making para methoxy phenyl azo metaphenylene diamine:

Dissolve 12.3 gms. of para anisidine in 200 cc. of distilled water and 20 cc. of hydrochloric acid (sp. g. 1.19). The temperature of the solution should not be over 35° C. Diazotize by adding 7.0 gms. sodium nitrite dissolved in 30 cc. water. The mixture is stirred vigorously for several minutes, the temperature should not be allowed to rise over 35° C. and if necessary several pieces of ice may be added. Up to this temperature no nitrogen separates out. The end of the reaction is of course controlled by means of potassium iodide starch paper.

Dissolve 10.8 gms. meta phenylene diamine and 42 gms. sodium acetate (3 mols. water of crystallization) in 400 cc. distilled water and add this solution to the diazotized anisidine stirring constantly. After standing half an hour add ammonia to slight excess, sufficient to produce a mild alkaline reaction. Filter, wash the precipitate with 500 cc. water and dry. The yield should be about 95% of theoretical.

The precipitate can be purified in one of the following ways:

1. Dissolve in a minimum quantity of hot methyl alcohol, filter, cool on ice and filter the mother liquor off the precipitated crystals. Dry in a vacuum desiccator. The purified product should consist of yellow flake-like crystals with a silky shimmer melting at 157–158° C. To form the hydrochloride add one molecule of hydrochloric acid for every molecule of the base, mix thoroughly and dry on a water bath.

2. Dissolve 90 gms. of the base in 3½ liters of water containing 20 cc. of hydrochloric acid (sp. g. 1.19) and heat to 90° C. This is just enough hydrochloric acid to form the mono hydrochloride. Filter, cool and add to the filtrate 190 cc. of hydrochloric acid. This will precipitate almost entirely the hydrochloride which can be filtered out and washed with a small quantity of dilute hydrochloric acid. Dry on a water bath.

3. Dissolve 90 gms. of the base in 3½ liters of water containing 20 cc. hydrochloric acid as above. Heat to 90° C., filter and add 1 liter of a 30% sodium chloride solution. Cool, filter and wash the precipitate with a small quantity of cold water. The hydrochloride is a black crystalline powder which dissolves readily in water to form a cherry red solution.

Method of making para ethoxy phenyl azo meta phenylene diamine:

Dissolve 13.7 gms. para phenetidine in 200 cc. distilled water and 20 cc. hydrochloric acid (sp. g. 1.19). The rest of the process is exactly the same as that outlined above for making corresponding methyl ether.

The purified base is a crystalline orange-yellow substance melting over a wide range between 117 and 120° C. It dissolves readily in hot alcohol, in cold acetic acid, pyridine and chloroform. It dissolves only slightly in carbon tetrachloride, benzol and is almost insoluble in ether. The mono hydrochloride is a black crystalline powder with a greenish tinge which dissolves readily in water to form a cherry red solution.

In the same manner para propoxy phenyl azo meta phenylene diamine may be prepared, but the latter displays much lower bacteriostatic index than that of the corresponding ethyl ether. The original substance used in the synthesis of this dye was obtained by the Spiegel and Sabbath method, from propylene bromide and potassium nitro phenolate. The resulting nitro ether was then reduced by means of tin and hydrochloric acid to the propyl ether of para-hydroxy aniline. (See Ber. 34, page 1935, 1901.)

Due apparently to the increased size of the alkyl group, this dye showed less marked basic properties and the hydrochloride hydrolized readily in water solution.

The free base is almost identical in appearance with the lower members of the family, i. e., orange yellow crystals which when recrystallized from methyl alcohol melt at 133 to 134° C. The monohydrochloride is a microcrystalline chocolate-colored powder melting and splitting off HCl between 167 and 173° C.

Para butoxy phenyl azo meta phenylene diamine is prepared in the same manner by coupling the diazotized butyl ether of para amino phenol with meta phenylene diamine. The free base is a yellow crystalline substance which when recrystallized from methyl alcohol melts at 127 to 130° C. The monohydrochloride is a black crystalline substance exhibiting all the properties of the other homologues but hydrolyzes readily in water and has lower bacteriostatic properties than the other members of the family.

The iso amyl ether of para-hydroxy phenyl azo meta phenylene diamine may be prepared by first forming the amyl ether of para amino phenol by heating in a sealed tube the sodium salt of para amino phenol and amyl bromide. After purification by steam distillation this substance may be diazotized and coupled with meta phenylene diamine.

The free base is a brownish black substance, which after recrystallizing from methyl alcohol, melts at 112° C. The hydrochloride readily hydrolyzes and forms only a very dilute water solution. The substance was found to possess excellent bacteriostatic properties but hydrolyzed so completely as to make it difficult to test in vitro. The action in vivo is similar to the other members of the family.

The preferred compound of those described is para ethoxy phenyl azo meta phenylenediamine hydrochloride.

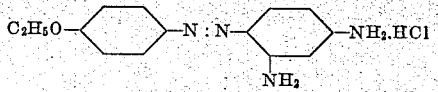

This compound has an exceptionally high bacteriostatic index combined with a relatively high bactericidal power and negligible toxicity. In particular, it is bactericidal toward both gram-positive and gram-negative germs. In a concentration of 1:500 it destroys *Staphylococcus albus, Staphylococcus aureus*, B para-typhoid -A B. para-typhoid-B. B. coli. com. and Flexner's B. dysenteria in 2 to 3 hours or even sooner. Even in a dilution of 1:10000 it kills off B. para-typhoid A in 3 hours or less.

The bacteriostatic index of this compound is also very high when its negligible toxicity is considered. For example, agar-agar media containing it in a concentration of 1:18,000 to 1:25,000 stop the growth of *S. albus, S. aureus, Str. hæm.* etc. at a pH ranging between 6.8 and 8.4.

When introduced into the human system it is selectively adsorbed by the tissues and organs of the genito-urinary tract. When regularly ingested it accumulates in these organs, gradually saturating them. Its toxicity is so low that rabbits tolerate a subcutaneous injection of it in a dilution of 1:50, to the amount of 0.3 gms. per kilogram of body-weight; they remain alive in spite of the necroses which inevitably develop at the point of puncture due to the very large volume (about 30 cc.) of the supersaturated solution that is injected, and hydrolyzes with formation of free HCl.

The compound is eliminated from the system almost entirely through the kidneys.

While preferred methods of preparation have been described, it is obvious that changes may be made without departing from the scope of the invention.

Having thus described my invention, what I claim and desire to protect by Letters Patent is:

1. A new compound comprising the group

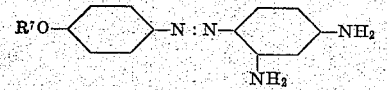

where $R^7$ may be hydrogen or $C_nH_{2n+1}$, $n$ being less than nine, and the benzene nuclei are free from acidic substituents.

2. A new compound comprising the group

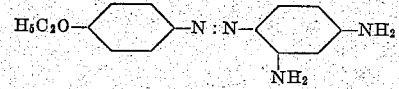

3. A new compound having the formula

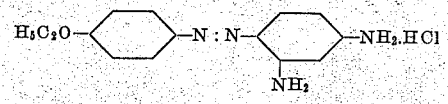

4. The method of preparing a new chemical compound which comprises diazotizing an alkoxy aniline, coupling with a diamino benzene having the amino groups in the meta position to one another, and purifying.

5. A method of preparing a new chemical compound which consists in diazotizing para phenetidine, coupling with meta phenylene diamine, and purifying.

6. A method of preparing a new chemical compound which consists in diazotizing para phenetidine, coupling with meta phenylene diamine and forming the hydrochloride and purifying by treating with dilute hydrochloric acid.

7. A new compound comprising the group

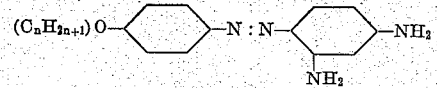

where $n$ is less than 9.

Signed at New York city, county of New York, State of New York, this 10th day of April, 1930.

IWAN OSTROMISLENSKY.